United States Patent
Horneffer

[11] Patent Number: 5,080,207
[45] Date of Patent: Jan. 14, 1992

[54] SERVO-ASSISTED GEAR SELECTOR

[75] Inventor: Franz Horneffer, Meckenbeuren, Fed. Rep. of Germany

[73] Assignee: Zahnradfabrik Friedrichshafen AG, Friedrichshafen, Fed. Rep. of Germany

[21] Appl. No.: 458,675
[22] PCT Filed: Jun. 22, 1988
[86] PCT No.: PCT/EP89/00578
§ 371 Date: Jan. 17, 1990
§ 102(e) Date: Jan. 17, 1990
[87] PCT Pub. No.: WO89/00515
PCT Pub. Date: Jan. 26, 1989

[30] Foreign Application Priority Data

Jul. 22, 1987 [DE] Fed. Rep. of Germany ....... 3724272

[51] Int. Cl.$^5$ .............................................. B60K 41/22
[52] U.S. Cl. .................................. 192/3.63; 192/30 W
[58] Field of Search ........................... 192/3.63, 30 W

[56] References Cited

U.S. PATENT DOCUMENTS

| | | | |
|---|---|---|---|
| 4,301,908 | 11/1981 | Fukuda et al. | 192/30 V X |
| 4,517,646 | 5/1985 | Magnusson et al. | 364/424.1 |
| 4,591,035 | 5/1986 | Ueda et al. | 192/30 W X |
| 4,592,249 | 6/1986 | Lehmann et al. | 192/30 W X |
| 4,886,151 | 12/1989 | Muller et al. | 192/3.63 X |
| 4,924,992 | 5/1990 | Romig | 192/85 C X |

FOREIGN PATENT DOCUMENTS 73280 3/1983 European Pat. Off. .
598153 2/1948 United Kingdom ................. 74/336

OTHER PUBLICATIONS

ZF-Eashyshift Elektro-Pneumatische Schaltung (ES) für Synchrongetriebe.
ZF-Ecoshift Automatisierte Vorwähl-Schaltung (AVS) für Synchrongetriebe.
Elektronisch Pneumatische Schaltung—EPS—pp 3-25.
Scania-Leichter Schalten Mit Computer.

Primary Examiner—Allan D. Herrmann
Assistant Examiner—Nicholas Whitelaw
Attorney, Agent, or Firm—Herbert Dubno

[57] ABSTRACT

Servo-assisted gear selection for a vehicle gearbox and gear change controlled by the driver by actuating the clutch, wherein the driver is informed of the selection having been performed in the gearbox by a haptic or tactile signal at the clutch pedal. The signal is transmitted mechanically from an electromagnet to the clutch pedal, or the electromagnet is arranged in the pedal plate of the clutch pedal. The signal generator may also consist of an electromagnet in conjunction with a pressure piston, which acts on the pressure line of the clutch actuating mechanism, or of an electropneumatic valve in conjunction with a differential piston signal generator.

10 Claims, 3 Drawing Sheets

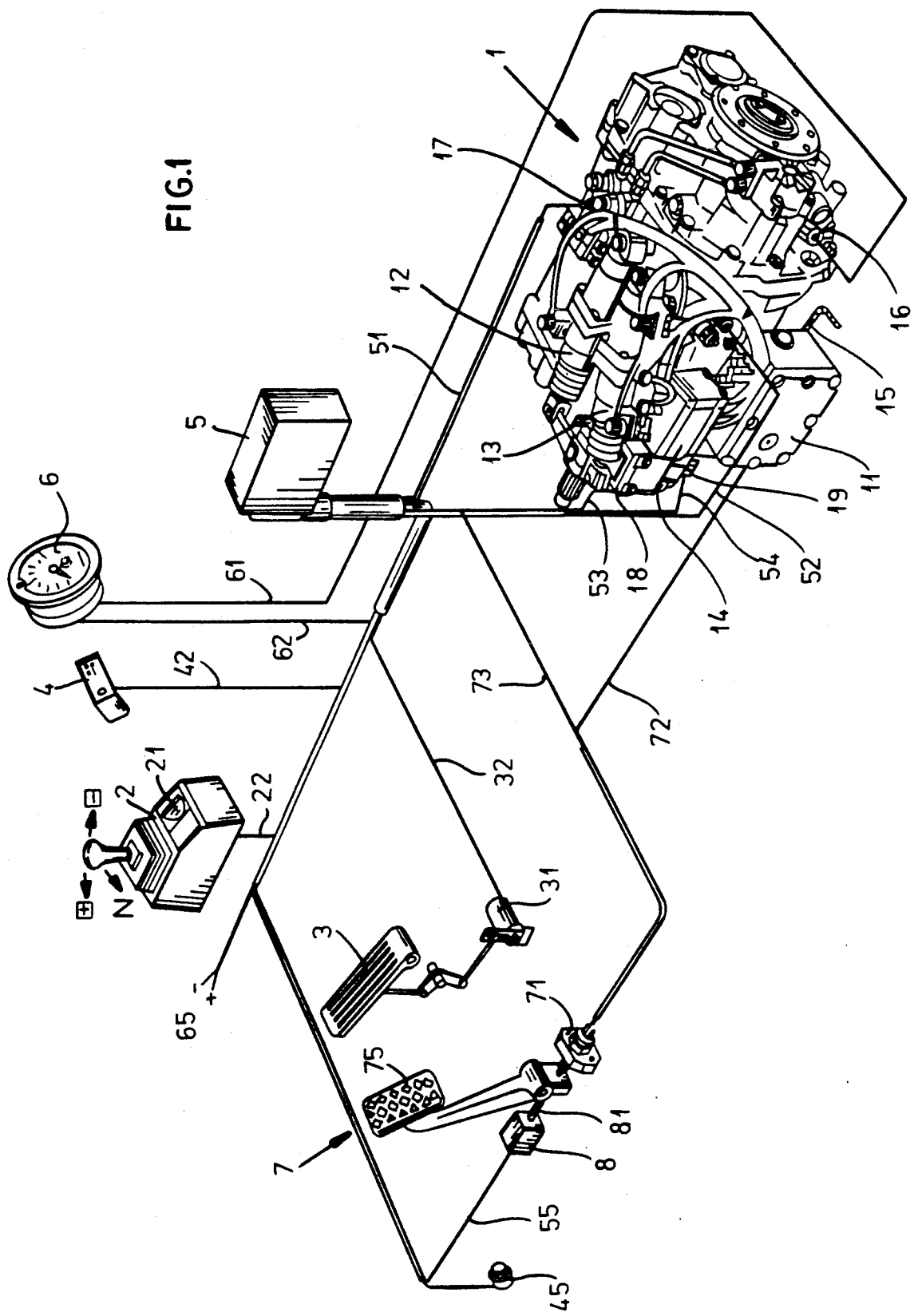

SERVO-ASSISTED GEAR SELECTOR

CROSS REFERENCE TO RELATED APPLICATIONS

This application is a national phase of PCT/EP88/00578 filed June 30, 1988 based upon German National application P 37 24 272.5 of July 22, 1987 under the International Convention.

FIELD OF THE INVENTION

The present invention relates to a servo-assisted gear selector for vehicle gearboxes with gear preselection and gear change controlled by the driver by actuating the clutch at the clutch pedal and wherein the driver is informed of the selection performed in the gearbox by a signal.

BACKGROUND OF THE INVENTION

Such gear selectors, in which the driver or an electronic device merely selects the gear, and the gear change is performed in the gearbox proper by a servo-assisted actuating device rather than directly by the driver via a shifting linkage, have been known in many designs, e.g., ZF [Zahnradfabrik Friedrichshafen AG] Specification for electropneumatic selection (ES) for synchromesh transmissions F 43546/RT 3430-885, ZF specifications for automated preselector (APS) for synchromesh transmissions F 32437/RT 3431-885.

electronic-pneumatic selector EPS for trucks of Daimler Benz Aktiengesellschaft, Order No. 6510302300 of March 1986, Scania - Leichter schalten mit Computer (Shift more easily by a Computer), page 4, column 2, paragraph 2.

In all these designs, the clutch and consequently the drive train between the engine and the gearbox is disengaged and engaged, as before, by the driver via the clutch pedal by the driver. While in the case of gear selection via a shifting linkage, the driver recognizes when the gear has been selected as a consequence of the direct contact with the shifting means in the gearbox, this information, which is generated in conjunction with the actuation of the gear shift lever and the shifting linkage, is lacking in the case of a servo-assisted gear selector. To ensure properly timed actuation of the clutch, especially for engaging the clutch after completion of the selection in the gearbox, a corresponding feedback must be generated in order to again engage the drive train disengaged via the clutch shortly after completion of the selection process in the gearbox.

It is known from the first-mentioned ZF publication for an electropneumatic selector (ES) that the corresponding gear can be selected with the lever of the gear selector. A noticeable restoring force acts against the selection movement, and this force is abolished as soon as the gear selected in the gearbox is thrown in. The lever can now be moved easily into the end position. This also represents a signal for re-engagement for the driver.

In the automated preselector (APS) according to the second ZF publication, the feedback on completion of the selection is an acoustic feedback generated by a buzzer, page 2, column 2, paragraph 1. This also represents the signal for re-engagement for the driver. According to the EPS Manual on trucks of Daimler Benz Aktiengesellschaft, page 8, the selection is complete only when the gear shift lever can be moved farther out of a looked preselected position into position 2, which is present in each direction of shifting. The clutch pedal and the gear shift lever can be released only when the gear selected is shown in the display.

It is recognizable from the Scania brochure titled "Leichter Schalten mit Computern" (Shift more easily by a Computer), page 4, paragraph 1, that a buzzing tone signals to the driver when the selection process is complete and the clutch can be released.

Even though the connection of the feedback for the selection performed in the gearbox to the gear shift lever does provide the driver with information, which comes closest to the information from a gear selector with a shifting linkage, it is bound, as is shown by the examples presented, to the gear shift lever or a comparable gear shifting lever, and involves high cost of construction.

Even though an acoustic signal can be easily realized, it is not particularly suitable as information for the driver, and such signals are burdensome in the case of frequent gear shiftings. In addition, acoustic signals are used as warning signals, whereas the feedback on the selection in a gearbox represents a perfectly normal, but necessary piece of information in the case of servo-assisted selection.

OBJECT OF THE INVENTION

It is therefore an object of the present invention to provide an improved feedback for the selection performed in the gearbox in a servo-assisted gear selector and, in particular, such that this feedback is bound to a gear selector lever or gear shift lever, and will also not be an acoustic signal.

SUMMARY OF THE INVENTION

This object is achieved, in accordance with the invention by providing the feedback signal as a haptic or tactile signal.

The transmission of a haptic or tactile signal in conjunction with a selection performed in the gearbox to the clutch pedal unmistakably informs the driver that he can again engage a gear. Consequently, he feels the signal at the point at which actuation is to be performed. This tactile signal is not burdensome for the driver, and it also does not represent a distraction for him, as is possible in the case of acoustic or optical signals. The transmission of the hatpic signal is not bound to a gear selector lever or gear shift lever any longer, so that the servo-assisted gear selector can also be used in a simple manner in conjunction with an electronic gear selector, without manual preselection.

Realization is possible electrically in conjunction with, an electromagnet, but also electropneumatically or electrohydraulically, in conjunction with a solenoid valve. The electromagnet can be connected via a short linkage to the clutch pedal, but it may also be arranged directly in the plate of the clutch pedal. The intensity of the haptic or tactile signal can be adjusted in a simple manner via a potentiometer with which the voltage is regulated. The arrangement of a signal generator in the form of an electromagnet in conjunction with a pressure piston which acts on the pressure line between a transducer piston-generator unit at the clutch pedal and a slave piston cylinder unit at the clutch is especially favorable. The pressure signal generated is transmitted via the transducer piston-cylinder unit and the linkage to the clutch pedal and can be felt at the driver's foot. The signal may also be generated via pressurized media, in which case an electropneumatic 3/2-way valve can release compressed air, after shifting is completed from a pressurized medium source to a signal generator, which generates a pressure shock via a differential piston, and this pressure shock is again transmitted to the clutch pedal via the transducer piston-cylinder unit and a linkage.

BRIEF DESCRIPTION OF THE DRAWING

The above and other objects, features and advantages of my invention will become readily apparent from the following description, reference being made to the accompanying highly diagrammatic drawing in which:

FIG. 1 is a connection diagram of an electropneumatic circuit embodying the invention;

SPECIFIC DESCRIPTION

Figure 3:
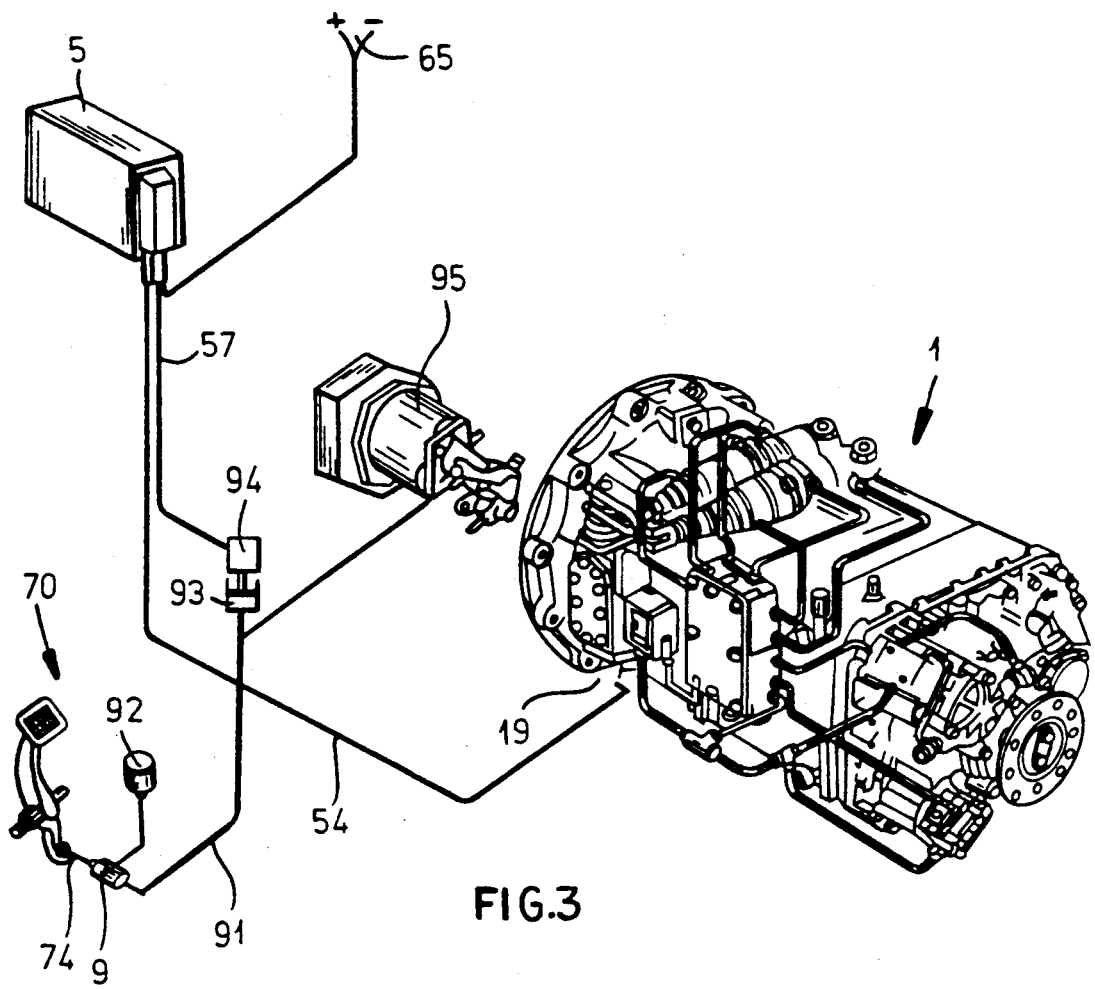
FIG. 3 is a connection diagram of a servo-assisted actuating mechanism or a clutch with an electromagnet and a pressure piston as a signal generator.

The connection diagram for an electropneumatic gear selector of FIG. 1 shows a vehicle gearbox 1 with a valve block 11 and three selecting cylinders 12, 13, and 14 for, e.g. three groups of gears. A pressurized medium, e.g. compressed air, is admitted into the valve block in the known manner via a line 15. A gear selector 2 with a range selector 21, an accelerator pedal 3 with a load transducer 31, as well as an optical gear display 4 are connected to an electronic control unit 5 via electrical lines 22, 32, and 42. An electronic tachograph 6 is also connected via lines 61 and 62 to both an electrical pulse generator 16 on the gearbox 1 and the electronic control unit 5, and a clutch pedal 7 is connected via the release switch 71 to said valve block 11 via line 72 and to control device 5 via line 73.

The connection to the vehicle's electrical supply system is designated by reference numeral 65, and an engine brake switch is designated by reference numeral 45.

The electronic control unit 5 is switched to "gear selected" position with the electronic inductive transducer 17 via line 51, with the valve block 11 via line 52, with the switch 18 for the neutral position via line 53, and with the display switch 19 for "gear selected" via line 54.

Yet another signal generator 8 is arranged at the clutch pedal 7; this signal generator 8 receives an electrical signal from the display switch 19 on the gearbox 1 primarily via the electronic control unit 5 and line 55 and transforms it into a haptic signal which is felt by the driver at the clutch pedal 7 when the selection in the gearbox has been completed. A gear can be engaged only after this signal has been perceived. This signal replaces the information on completed selection in a servo-assisted gear selector, which can be felt via the shifting linkage on the gear shift lever in the case of an ordinary manual gear selector or a system which informs the driver of completion of selection by, e.g., optical or acoustic signals in the case of servo-assisted gear selectors.

If said signal generator 8 is an electromagnet, as is shown in FIG. 1, the haptic signal is transmitted via the armature 81 to the clutch pedal 7.

Figure 2:
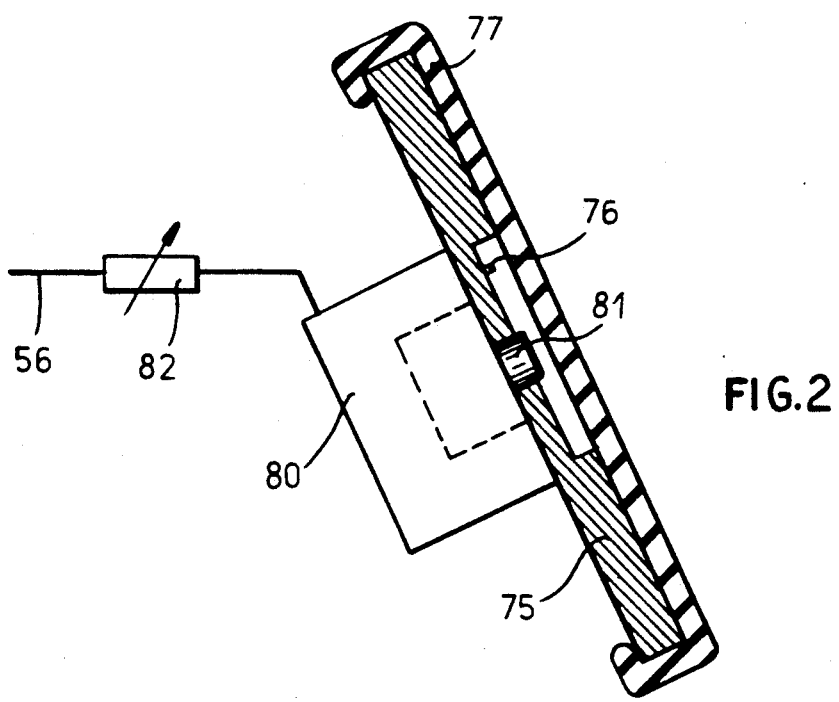
FIG. 2 is an enlarged sectional view which an electrical signal generator arranged in the clutch pedal.

As is shown n FIG. 2. the electromagnet 80 may also be arranged directly in the pedal plate 75, so that the armature 81 can transmit the haptic signal directly or via a transmitting plate 76 to a surface area, e.g. a rubber plate or a rubber profile 77, with which said pedal plate 65 is covered. Because the driver keeps the clutch pedal actuated (clutch pressed down) in this state in which selection in the gearbox has not yet been made or, if the signal arrived it has just been made, he feels this signal in a simple manner without any optical or acoustic nuisance, and he can again release the clutch pedal 7 for engaging. It is also possible to arrange a potentiometer 82 in the electrical line 56 leading to the electromagnet 80 for setting the voltage, because the intensity of the haptic signal can thus be regulated.

FIG. 3 shows the clutch pedal 70 in conjunction with a transducer piston-cylinder unit 9, a line 91 for a pressurized medium, and a slave piston-cylinder unit 95. As is apparent from FIG. 4, the piston of the slave piston-cylinder unit is mechanically connected to the clutch release mechanism 180 of clutch 190 and actuates said clutch. Losses of pressurized medium are compensated for via a container 2 for pressurized medium, and a pressure piston 93 acting on the line 91 for the pressurized medium is actuated via an electromagnet 94 and acts as a signal generator for the haptic signal. The clutch is disengaged during the selection process in the gearbox 1 as a consequence of the clutch pedal 70 being actuated. The actuation takes place over the short linkage 74, the transducer piston-cylinder unit 9, and the pressurized medium, e.g. hydraulic oil in line 91, to the slave piston-cylinder unit 95.

Figure 4:
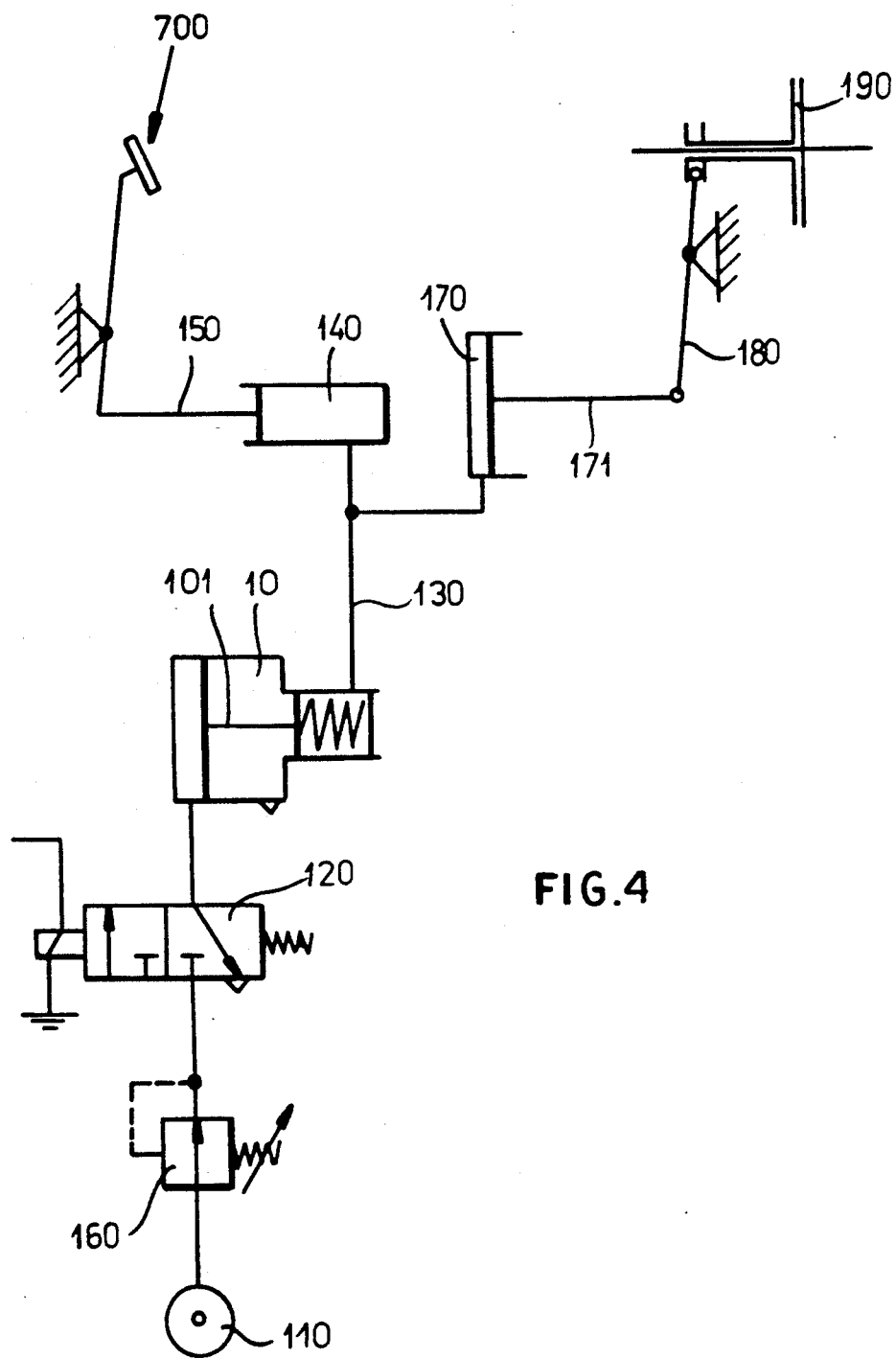
FIG. 4 is a diagram of a servo-assisted actuating mechanism for a clutch with an electropneumatic valve and a differential piston unit as a signal generator.

Once the desired gear has been engaged in the gearbox 1, the display switch 19 sends "gear selected" to the electronic control unit 5 via line 54, and the electromagnet 94 is energized by the electronic control unit via electrical line 57. A pressure signal, which is transmitted as a single shock or at intervals to the clutch pedal 70 via the transducer piston-cylinder unit 9 and the linkage 74, is generated in line 91 via the pressure piston 93. The driver feels the pressure signal at his foot and can release the clutch pedal 70, because shifting in the gearbox has been completed. FIG. 4 shows a possibility for generating the haptic signal acting on clutch pedal 700 via a signal generator 10 in conjunction with an electropneumatic 3-part, 2-position valve 120, especially when the pressurized agent for actuating the clutch and the gears is air. As is described in connection with FIG. 3, the 3/2 valve is activated, like the electromagnet 94, after completion of the shifting in the gearbox 1. Pressurized medium is thus sent from a source 110 of pressurized medium via the opened electrical 3/2 valve 120 to the signal generator 10. The actual haptic signal in the pressure line 130 is generated via a differential piston 101 and, as is described in FIG. 3, it is transmitted via the transducer piston-cylinder unit 140 and the linkage 150 to the clutch pedal 700. A pressure reducing valve 160 may also be provided to define the haptic signal. As is described in connection with FIG. 3, line 130 is connected to the actuating piston-cylinder unit 170 for the clutch 190, and piston 171 is connected to the clutch release mechanism 180.

I claim:

1. A gear-selection assembly, comprising:
a vehicle gearbox;

servoassist means operatively connected with said gearbox for shifting gears thereof;

operator-controlled gear-selection means operatively connected to said servoassist means for selecting a gear into which said gearbox is to be shifted;

a clutch pedal depressable by an operator in response to actuation of said operator-controlled gear-selection means to enable shifting of gears by said gear box; and means responsive to a gearshift performed in said gearbox for generating a haptic signal and applying said signal to said clutch pedal in a form tactilely sensed by said operator while said clutch pedal is depressed, to indicate that said clutch pedal can be released to reengage gears following shifting thereof.

2. A gear-selection assembly, comprising:
a vehicle gearbox;
servoassist means operatively connected with said gearbox for shifting gears thereof;
operator-controlled gear-selection means operatively connected to said servoassist means for selecting a gear into which said gearbox is to be shifted;
a clutch pedal depressable by an operator in response to actuation of said operator-controlled gear-selection means to enable shifting of gears by said gear box; and
means including a signal generator arranged at or on said clutch pedal and responsive to a gearshift performed in said gearbox for generating a haptic signal and applying said signal to said clutch pedal in a form tactilely sensed by said operator while said clutch pedal is depressed, to indicate that said clutch pedal can be released to reengage gears following shifting thereof.

3. The gear-selection assembly defined in claim 2 wherein said signal generator is an electrical signal generator.

4. The gear-selection assembly defined in claim 3 wherein said signal generator includes an electromagnet arranged in a plate of said clutch pedal, and an armature of the electromagnetic acting directly on a cover of the clutch plate.

5. The gear-selection assembly defined in claim 3 wherein said signal generator includes an electromagnet arranged in a plate of said clutch pedal, and an armature of the electromagnet acting on a cover of the clutch plate via a transmission plate.

6. The gear-selection assembly defined in claim 3 wherein said signal generator includes an electromagnet and a potentiometer is connected in circuit with said signal generator for regulating said haptic signal.

7. A gear-selection assembly, comprising:
a vehicle gearbox;
servoassist means operatively connected with said gearbox for shifting gears thereof;
operator-controlled gear-selection means operatively connected to said servoassist means for selecting a gear into which said gearbox is to be shifted;
a clutch pedal depressable by an operator in response to actuation of said operator-controlled gear-selection means to enable shifting of gears by said gear box; and
means including a pressure shock generator responsive to a gearshift performed in said gearbox for generating a haptic signal in the form of a pressure shock and applying said signal to said clutch pedal in a form tactilely sensed by said operator while said clutch pedal is depressed, to indicate that said clutch pedal can be released to reengage gears following shifting thereof.

8. The gear-selection assembly defined in claim 7 wherein said means for generating a haptic signal includes:
a transducer piston-cylinder unit at said clutch pedal and coupled thereto;
a slave piston-cylinder unit at a clutch operated by said pedal;
a pressure line connecting said units;
a pressure piston connected to said pressure line and actuatable to generate a pressure shock therein; and
means for operating said pressure piston to produce said pressure shock whereby said pressure shock is transmitted as said haptic signal to said clutch pedal.

9. The gear-selection assembly defined in claim 7 wherein said means for generating a haptic signal includes:
a transducer piston-cylinder unit at said clutch pedal and coupled thereto;
a slave piston-cylinder unit at a clutch operated by said pedal;
a pressure line connecting said units;
a pressure piston connected to said pressure line and actuatable to generate a pressure shock therein; and
means including an electropneumatic directional control valve for operating said pressure piston to produce said pressure shock whereby said pressure shock is transmitted as said haptic signal to said clutch pedal.

10. The gear-selection assembly defined in claim 9 further comprising an adjustable pressure reducing valve between a source of pressurized medium and said electropneumatic directional control valve.

* * * * *